US010689047B2

(12) United States Patent
Krylatov

(10) Patent No.: US 10,689,047 B2
(45) Date of Patent: Jun. 23, 2020

(54) GYRO-STABILIZER FOR A TWO-WHEELED SINGLE-TRACK VEHICLE

(71) Applicant: OBSHCHESTVO S OGRANICHENNOI OTVETSTVENNOSTYU "GYROBAYK", Nizhny Novgorod (RU)

(72) Inventor: Alexey Valerievich Krylatov, Nizhny Novgorod (RU)

(73) Assignee: OBSHCHESTVO S OGRANICHENNOI OTVETSTVENNOSTYU "GYROBAYK", Nizhny Novgordo (RU)

( * ) Notice: Subject to any disclaimer, the term of this patent is extended or adjusted under 35 U.S.C. 154(b) by 0 days.

(21) Appl. No.: 16/342,228

(22) PCT Filed: Oct. 17, 2017

(86) PCT No.: PCT/RU2017/000764
§ 371 (c)(1),
(2) Date: Apr. 16, 2019

(87) PCT Pub. No.: WO2018/074949
PCT Pub. Date: Apr. 26, 2018

(65) Prior Publication Data
US 2019/0233039 A1  Aug. 1, 2019

(30) Foreign Application Priority Data
Oct. 18, 2016  (RU) ................. 2016140803

(51) Int. Cl.
*G01C 19/30* (2006.01)
*B62H 7/00* (2006.01)
(Continued)

(52) U.S. Cl.
CPC ............ *B62H 7/00* (2013.01); *B62D 37/06* (2013.01); *G01C 19/06* (2013.01); *G01C 19/16* (2013.01); *F16C 11/10* (2013.01)

(58) Field of Classification Search
CPC ........ B62D 37/06; B62D 61/02; G01C 19/02; G01C 19/06
See application file for complete search history.

(56) References Cited

U.S. PATENT DOCUMENTS 5,253,525 A 10/1993 Fukui et al.
8,918,239 B2 12/2014 Kim et al.
(Continued)

FOREIGN PATENT DOCUMENTS

DE 102013200020 A1 7/2014
RU 2361780 C2 7/2009
(Continued)

OTHER PUBLICATIONS

English Abstract of DE102013200020 retrieved on Espacenet on Mar. 7, 2019.
English Abstract of RU2361780 retrieved on Espacenet on Mar. 7, 2019.
(Continued)

*Primary Examiner* — Jake Cook
(74) *Attorney, Agent, or Firm* — Dmitry S. Kryndushkin, IP Center Skolkovo

(57) ABSTRACT

A gyro-stabilizer for a two-wheeled single-track vehicle, preferably a motorcycle, applicable in several driving modes, is configured in the form of a gyroscope in a gimbal mount, an outer ring of which is connected by a two-way axial pivot joint to the vehicle frame, wherein the axis of said joint is oriented along the longitudinal axis of the vehicle; an inner ring of the gimbal mount is connected by a two-way axial pivot joint to the outer ring; and a spin axis of the gyroscope is connected by a two-way axial pivot joint to the
(Continued)

inner ring, wherein the axes of all three pivot joints are mutually perpendicular, and wherein the gyro-stabilizer has a means for locking rotation of the outer ring about the axis of the pivot joint between said outer ring and the frame of the vehicle. The gyro-stabilizer is disposed on the rear wheel swingarm and has a means for locking rotation of the inner ring about the axis of the pivot joint between the inner ring and the outer ring.

2 Claims, 5 Drawing Sheets

(51) Int. Cl.
  *B62D 37/06* (2006.01)
  *G01C 19/06* (2006.01)
  *G01C 19/16* (2006.01)
  *F16C 11/10* (2006.01)

(56) References Cited

U.S. PATENT DOCUMENTS

| 2005/0045398 | A1* | 3/2005 | Suzuki | B62D 61/02 |
| | | | | 180/209 |
| 2008/0227365 | A1* | 9/2008 | Lo | A63H 17/21 |
| | | | | 446/440 |

FOREIGN PATENT DOCUMENTS

| RU | 2546036 C1 | 4/2015 |
| SU | 187325 A1 | 10/1966 |

OTHER PUBLICATIONS (Book), Merkin, "Introduction to the Theory of Stability of Motion", Nauka, Moscow, 1987 and English Abstract, 305 pages.
International Search Report with regard to PCT/RU2017/000764 daed Feb. 21, 2018.
Search Report with regard to RU 2016140803 completed on Jul. 7, 2017.

\* cited by examiner

GYRO-STABILIZER FOR A TWO-WHEELED SINGLE-TRACK VEHICLE

CROSS-REFERENCE

The present application is a U.S. national stage entry of International Patent Application No. PCT/RU2017/000764, filed on Oct. 17, 2018, entitled "GYRO-STABILIZER FOR A TWO-WHEELED SINGLE-TRACK VEHICLE", which claims priority to Russian Patent Application No. 2016140803, filed on Oct. 18, 2016, the entirety of which is incorporated herein by reference.

FIELD OF THE INVENTION

The invention relates to the field of transport engineering, in particular to gyrostabilized two-wheeled vehicles, mainly motorcycles.

BACKGROUND

The gyro-stabilizer of the known gyroscopically stabilized vehicle [U.S. Pat. No. 8,918,239 B2] includes at least two longitudinally mounted non-free (with two degrees of freedom) gyroscopes in a single frame. Each gyroscope has a rotor, the axis of which is pivotally connected to the ring, which is pivotally connected to the frame. The stability of this two-wheeled vehicle is ensured by gyroscopic effect created by the rotation of these two non-free gyroscopes in the frame. The vehicle speed, the speed of gyroscope rotors and front wheel tilt angle are controlled by electronic sensors. The disadvantage of this gyrocar is that the electronics reduces the gyroscope (gyroscopes) rotation speed, i.e., reduces the vehicle stability at high speed cornering to provide for frame tilt inwards the corner.

There is another vehicle with two gyroscopes where swivel axes in the initial position are parallel to each other [Application DE No. 102013200020 A1]. In this case, each gyroscope is pivotally mounted on vehicle frame with the provision for forced rotation around axis, perpendicular to vehicle longitudinal axis. The gyroscopes rotate in different directions and the gyroscopic effect shall be levelled in the normal situation. Special electric motors (servomotors) shall rotate each gyroscope by microcontroller signal according to special algorithm, after which the gyroscopic effect shall start to bring the vehicle back to stable position in the event of skidding (yaw), i.e., uncontrolled vehicle rotation around vertical axis. This technical solution is aimed at solving only one task, namely the prevention of single-track vehicle (motorcycle) skidding at sufficiently high speeds. The gyro-stabilization is not considered in other possible situations, such as tilted vehicle cornering at low speeds.

Two-wheeled single-track vehicle gyro-stabilizer was chosen as a prototype [Patent RU No. 2546036 C1, MIIK B60P1/36, op. 10.02.2003.], made in the form of a gyroscope in the gimbal. The outer ring of the gimbal has a two-way axial swivel connection with the vehicle frame and the axis of this joint is directed along the longitudinal axis of the vehicle, the inner ring of the gimbal has a two-way axial swivel connection with the outer ring, the gyroscope rotor shaft has a two-way axial swivel connection with the inner ring of the gimbal, and the axes of all three swivel joints are mutually perpendicular, the gimbal outer ring serves as a support for the driver and the gyro-stabilizer locks the outer ring rotation around the axis of its swivel connection with vehicle frame. The two-wheeled vehicle cornering at high speed is its tilt in the direction of the turn without steering. The gyro-stabilizer maintains horizontal orientation of driver footpeg and feet and allows the driver to control the vehicle stability with the use of his/her feet and body reaction. When the outer ring is fixed perpendicular to the frame, the stability of the entire vehicle is ensured without driver's participation. The steering and speed depend only on driver skills as mentioned in the description to the said invention, but it should also be noted that in many respects the necessary skills are specific in their nature, for example, vehicle tilt at high speed when cornering, standing on a gyrostabilized platform. Moreover, the driver's reaction is obviously inferior to the speed of electronics.

SUMMARY OF THE INVENTION

The objective of the invention is the creation of a gyro-stabilizer for a two-wheeled single-track vehicle, applicable in as many driving modes as possible, as well as the correction or restriction of driver's actions that may lead to an accident situation. The authors also set the task of providing the possibility of installing a gyro-stabilizer both on the already existing motorcycle models and on the newly developed ones, taking into account the minimal design changes and modifications.

This task is solved by a gyro-stabilizer in the form of a gyroscope in a gimbal for a two-wheeled single-track vehicle, preferably a motorcycle, the outer ring of the gimbal has a two-way axial swivel connection with the vehicle frame, and the axis of this connection is directed along the longitudinal axis of the vehicle, the inner ring of the gimbal has a two-way axial swivel connection with the outer ring, the gyroscope rotor shaft has a two-way axial swivel connection with the inner ring of the gimbal, moreover, the axes of all three hinged joints are mutually perpendicular, while the gyro-stabilizer has a locking means for the outer ring rotation around the axis of its swivel connection with vehicle frame.

According to the proposal, the gyro-stabilizer is located on rear wheel pendulum and has a locking means for the inner ring rotation around the axis of its swivel connection with the outer ring, and each locking means is made in the form of a servo motor that provides for the possibility of forced rotation of the corresponding ring by the command of the microcontroller that controls the speed and permissible vehicle tilt angles, and additional load is attached to the inner ring on the axis of the swivel connection with rotor shaft.

BRIEF DESCRIPTION OF THE DRAWINGS

The claimed invention is explained by drawings.

Figure 1:
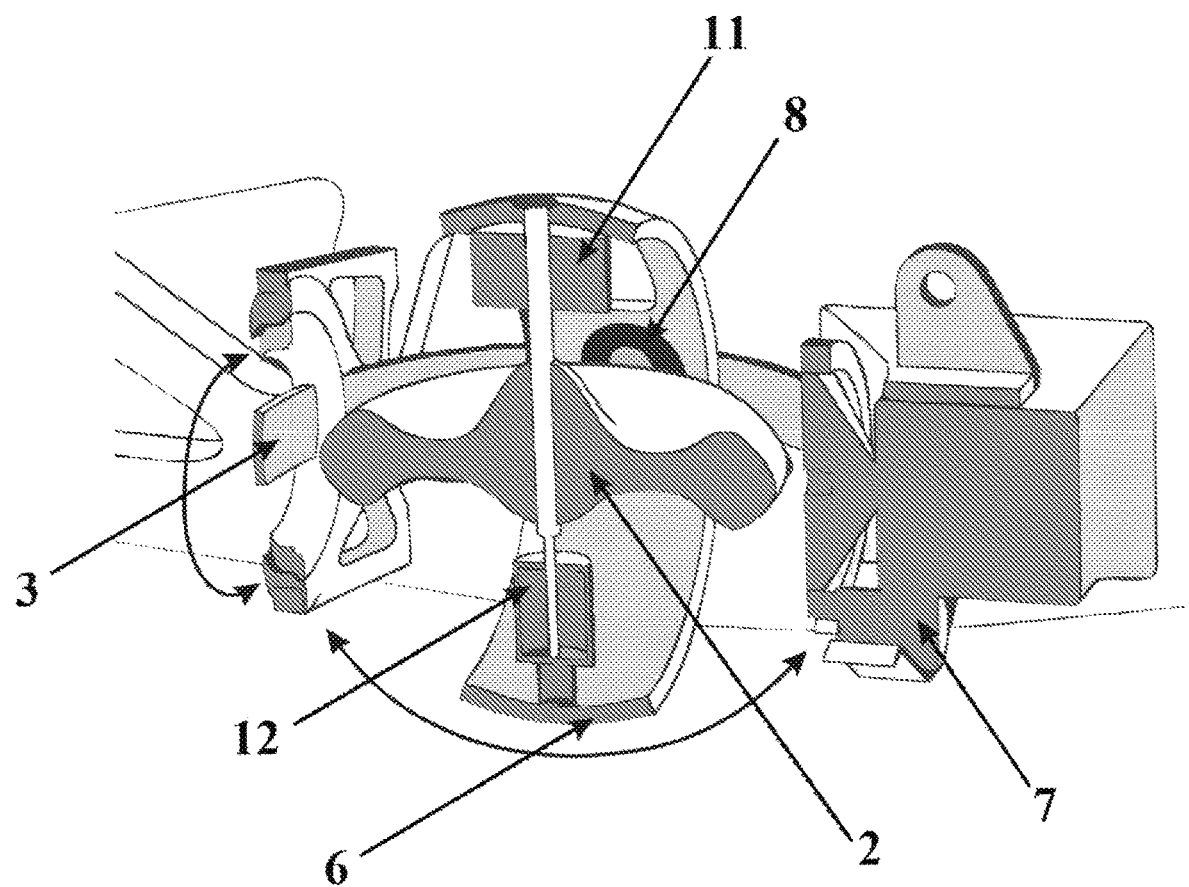
FIG. 1 presents a section view of the gyro-stabilizer device.
Figure 2:
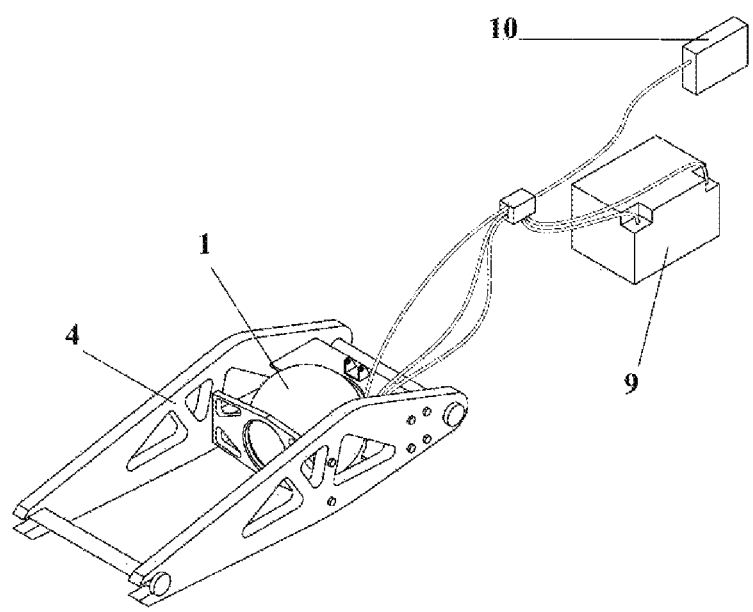
FIG. 2 presents an assembled view of vehicle (motorcycle) pendulum with a gyro-stabilizer.

Gyro-stabilizer 1 is represented by a gyroscope 2 in the gimbal, outer ring 3 of the gimbal has a two-way axial swivel connection with frame (pendulum) 4 of vehicle 5 and the axis of this joint is directed along the longitudinal axis of vehicle 5, inner ring 6 of the gimbal has a two-way axial swivel connection with outer ring 3, the gyroscope rotor shaft 2 has a two-way axial swivel connection with inner ring 6 of the gimbal and the axes of all three swivel joints are mutually perpendicular. Each of rings 3 and 6 are connected to servomotors 7 and 8, which in turn are connected to microcontroller 9, for example, with touch sensor control 10. Additional load 11 is attached to inner ring 6 on the axis of swivel connection with the rotor shaft. Gyroscope drive 2 incorporates electric motor 12.

DETAILED DESCRIPTION OF THE NON-LIMITING EMBODIMENTS

Figure 4:
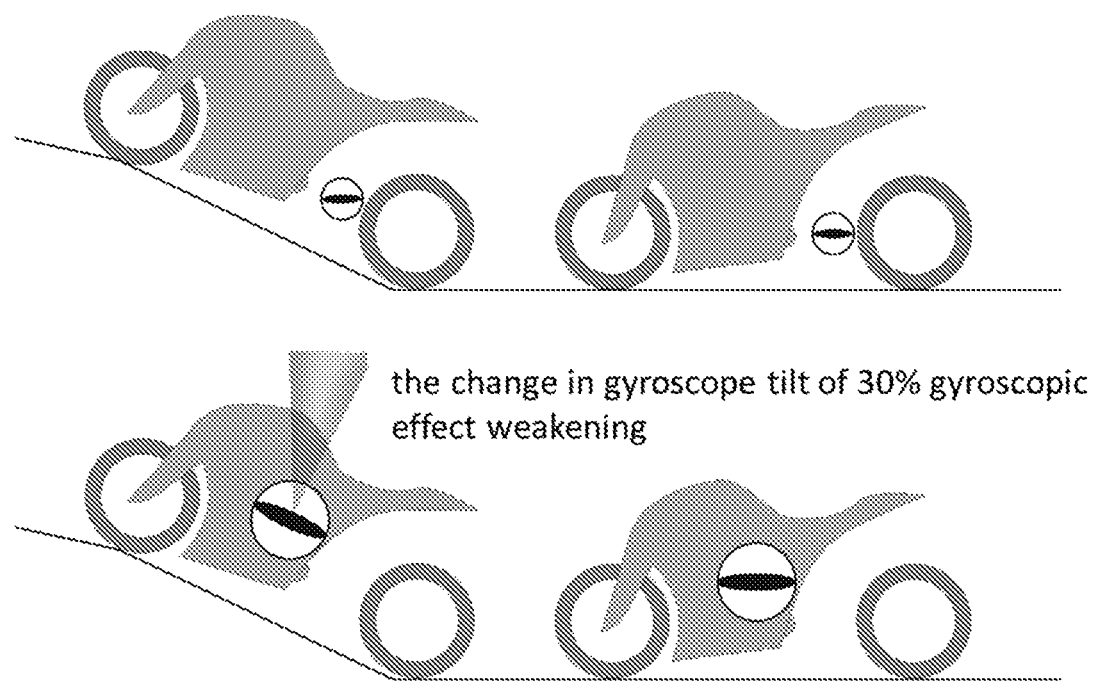
FIG. 4 presents the comparative scheme of the claimed gyro-stabilizer (A) and the gyro-stabilizer prototype (B) operation during ascent.

The gyro-stabilizer operates as follows:

Gyroscope 2 is started only after turning the ignition key. Flywheel (gyroscope) 2 spins for about 6-10 seconds depending on its diameter and weight, which in turn depends on the size and weight of a vehicle (motorcycle) 5. Gimbal rings 3 and 6 are not in any way locked at this stage. Then, the driver (pilot) removes motorcycle 5 from the footpeg and puts it in an upright position. At the same time, servomotor 7 sets ring 3 to horizontal position and fixes it (locks) in this position. Accordingly, gyro-stabilizer 1 goes into a non-free state (with two degrees of freedom) with one unstable coordinate (motorcycle position in longitudinal vertical plane). According to the first Thomson-Thet-Chetaev theorem the gyroscopic stabilization can be carried out only at an even number of unstable coordinates, thus, the second coordinate of the system (turning angle of ring 6) should also be unstable [See., for example: Merkin D. R. Introduction to road holding theory: Textbook for higher schools.—3rd ed., revised and amended—M.: Science. Editor-in-charge of phys.-math. lit., 1987, pp. 180-182]. Accordingly, servomotor 8 turns ring 6 in such a way that load 11 is placed at the top and held in this position. The gyroscopic stabilization of vehicle 5 in vertical position occurs when gyroscope 2 is spinned to design values. The speed of vehicle 5 in this mode can vary from 0 to approximately 10 km/h. In other motion modes the full unlocking of ring 3 does not occur (unlike the prototype). There is a constant correction of rings 3 and 6 position by the signal from microcontroller 9 when driving uphill or downhill, on bumpy terrain or liquid dirt. For example, when moving uphill (FIG. 4 A) the servomotors maintain horizontal position of ring 3 and the corresponding position of ring 6. The gyroscopic effect is reduced in the prototype scheme operation (FIG. 4 B). The gyroscope rings may be set to prevent skidding (yaw) by means of gyrostabilization similar to analogue solution [Application DE No. 102013200020 A1], when necessary. Also by the command from microcontroller 9 (in accordance with data received from different sensors) gyro-stabilizer 1 can fix (limit) the maximum possible vehicle 5 tilt angle when cornering depending on vehicle performance, road and weather conditions, etc. The pre-setting of microcontroller 9 individual parameters, disabling and connection of additional functions is possible from touch sensor control unit 10.

Figure 3A:
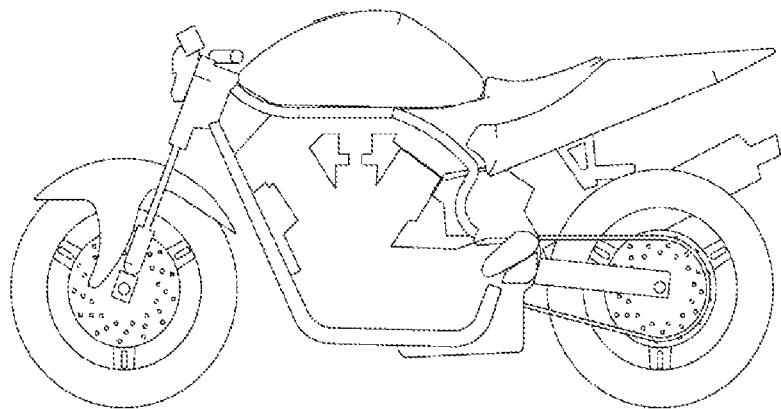
FIG. 3 presents the schematic images of vehicle before (A) and after the gyro-stabilizer installation (B).
Figure 3B:
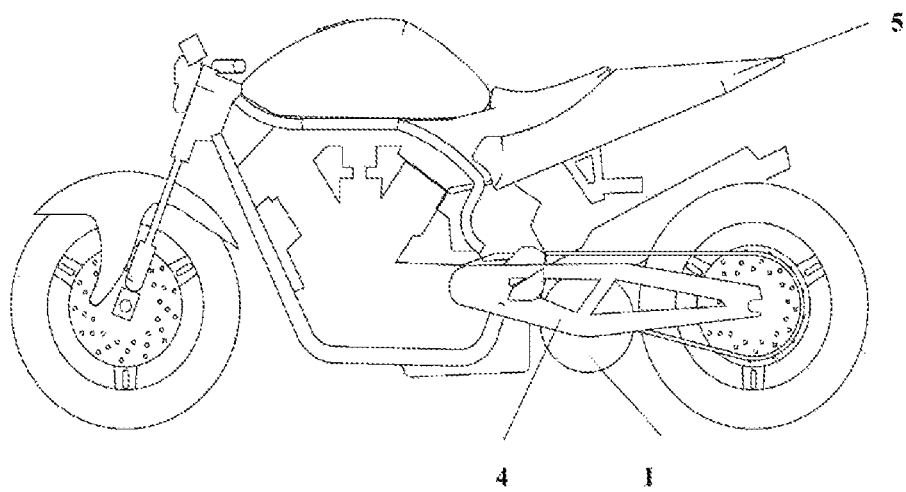
Figure 5:
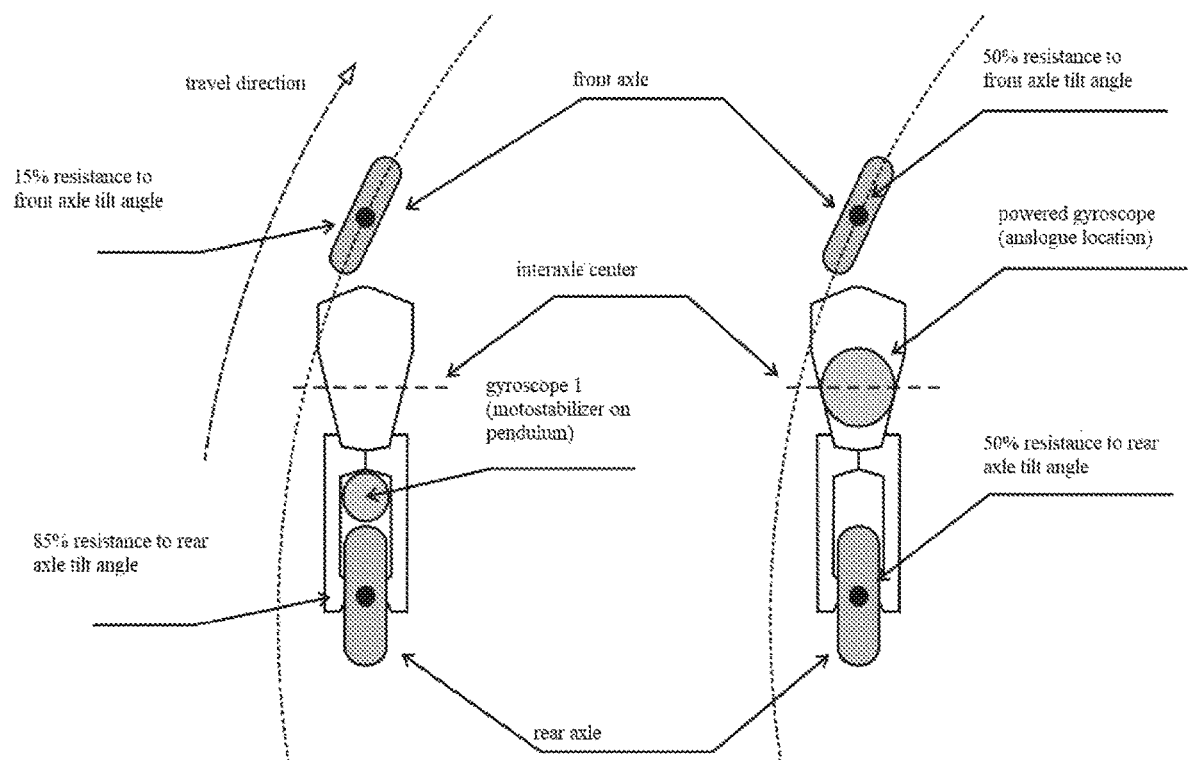
FIG. 5 presents the comparative scheme of the claimed gyro-stabilizer (A) and the gyro-stabilizer prototype (B) operation at cornering.

The placement of gyro-stabilizer on rear wheel pendulum 4 is primarily due to the fact that this is the only place where the stabilizer can be installed with no need to change the existing vehicle (motorcycle) 5 frame, the design geometry of which is approved by the chief designer and the manufacturer management. According to preliminary estimates, motorcycle 5 base will be elongated by 20 cm after gyro-stabilizer 1 installation on upgraded pendulum 4 (FIG. 3). Another factor that affects the steering is that gyro-stabilizer 1 is located not in the center but much closer to the rear axle of motorcycle 5. Gyro-stabilizer 1 affects pendulum 4, which is attached to the frame or engine, but turns and sets the direction of the front wheel so that the stabilizing effect would be applied to a lesser extent, and this is possible at the elongation from the interaxial center to the rear wheel thereby not interfering with gyro-stabilizer 1 vertical position or the specified deviation. Vehicle 5 becomes stable at low speeds and at the same time maneuverable as never before, if these factors are observed (FIG. 5).

INDUSTRIAL APPLICABILITY

The practical implementation of the claimed invention is an obvious task for the average specialist in the field of industry under consideration.

The invention claimed is:

1. A gyro-stabilizer for a two-wheeled single-track vehicle, comprising:
   a gyroscope in a gimbal;
   an outer ring of the gimbal having a first two-way axial swivel joint with a vehicle frame, and an axis of said first two-way axial swivel joint is directed along a longitudinal axis of the vehicle;
   an inner ring of the gimbal having a second two-way axial swivel joint with the outer ring;
   a gyroscope rotor shaft having a third two-way axial swivel with the inner ring of the gimbal;
   wherein a) axes of all three swivel joints are mutually perpendicular;
   b) the gyro-stabilizer has a lock for an outer ring rotation around the axis of the first swivel joint;
   c) the gyro-stabilizer is located on a rear wheel pendulum of the vehicle;
   d) the gyro-stabilizer has a lock for an inner ring rotation around the axis of the second swivel joint;
   e) each said lock is implemented as a servomotor configured to cause forced rotation of the corresponding ring based on a command from a microcontroller that controls at least speed of the vehicle and permissible tilt angles of the vehicle; and
   f) an additional load is attached to the inner ring on the axis of the third swivel joint.

2. The gyro-stabilizer according to the claim 1, wherein the two-wheeled single-track vehicle is a motorcycle.

* * * * *